United States Patent Office 3,498,880
Patented Mar. 3, 1970

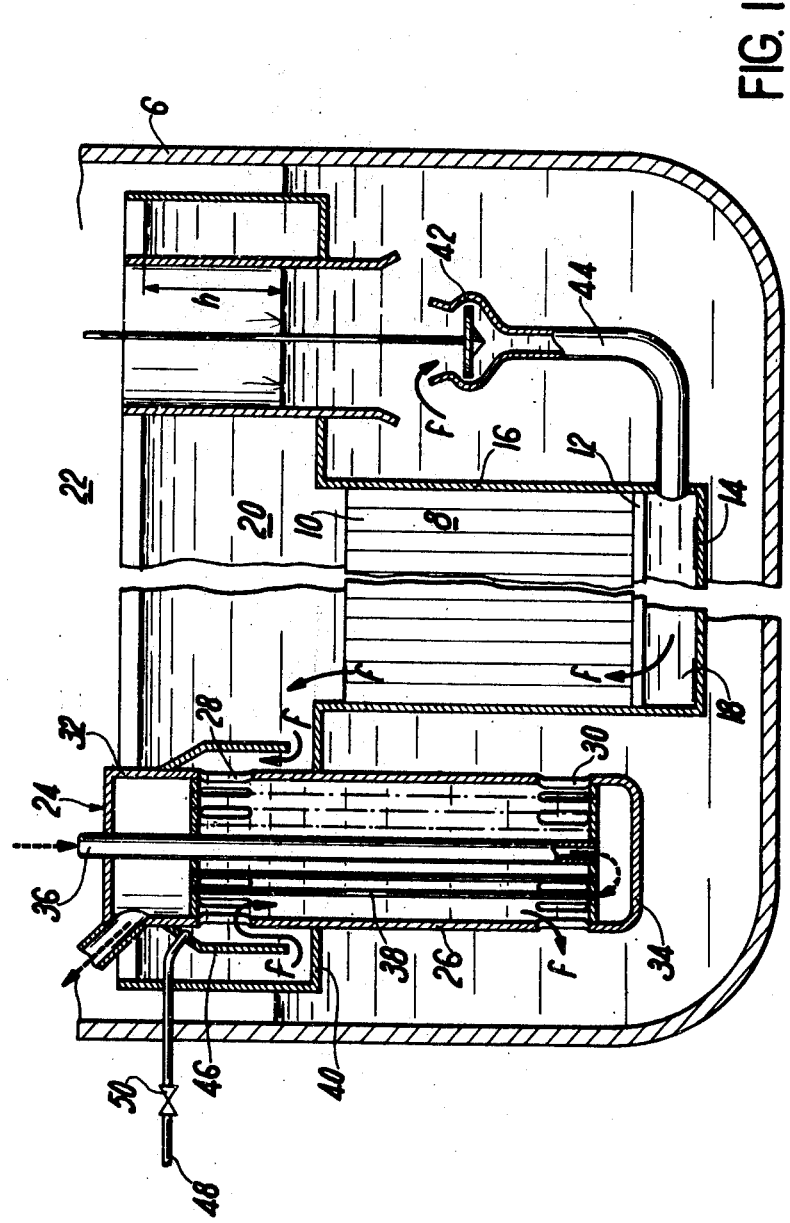

3,498,880
LIQUID COOLED NUCLEAR REACTOR WITH MEANS FOR ISOLATING HEAT EXCHANGER
Henri-Jacques Gollion, Aix-en-Provence, France, assignor to Commissariat a l'Energie Atomique, Paris, France
Filed Nov. 16, 1967, Ser. No. 683,544
Claims priority, application France, Dec. 23, 1966, 88,712
Int. Cl. G21c 19/28
U.S. Cl. 176—52          5 Claims

ABSTRACT OF THE DISCLOSURE

The nuclear reactor is cooled by circulating a liquid through a single vessel containing both the reactor core and a plurality of heat exchangers disposed in parallel. Each individual circuit for supplying coolant to each heat exchanger comprises a top point and a gas which is inert with respect to the coolant is injected at the said top point at a sufficient pressure to force the liquid downwards from the top point and to prevent it from flowing towards the corresponding heat exchanger when necessary.

---

This invention relates to nuclear reactors of the type which are cooled by a liquid and more especially reactors which are cooled by circulation of a liquid coolant in a vessel which contains the reactor core and a plurality of heat exchangers which operate in parallel; the invention is primarily applicable to fast reactors which are cooled by a circulation of molten metal (usually sodium).

In these reactors, the path followed by the coolant is usually as follows: the cooling liquid which passes out of the reactor core flows into a header which distributes the liquid between the heat exchangers; the coolant then flows into the heat exchangers and finally reaches a second header from which it is drawn by circulating pumps and returned into a distribution header, from which the coolant then flows through the reactor core.

This arrangement offers a certain number of advantages: the problems of connection between the reactor core and the heat exchanger are highly simplified, the danger of leakage is reduced, the reliability of the complete installation is improved. On the other hand, a problem arises under operating conditions in which the flow of the secondary fluid which is intended to remove the heat transferred from the reactor by the coolant has to be stopped in one or a number of heat exchangers while maintaining a circulation of coolant at a low rate of flow throughout the reactor vessel. Such a mode of operation can be of particular advantage for the purpose of operating the reactor at low power during certain periods or over a given time interval after shutdown. In point of fact, in the arrangement which has just been described, if the circulation of secondary fluid within one or a number of heat exchangers is interrupted while maintaining the flow of primary coolant, the secondary coolant is discharged from said heat exchanger or exchangers at a much higher temperature than the mean temperature of the second header and a temperature divergence of this order gives rise to a substantial danger.

The present invention is directed to the design concept of a nuclear reactor which meets practical requirements more effectively than has been proposed heretofore, especially insofar as the circulation of coolant in either one or a plurality of heat exchangers can be cut off whenever necessary without interrupting the flow in the other heat exchangers, while at the same time eliminating the danger mentioned above.

To this end, the invention proposes a nuclear reactor which is cooled by circulating a liquid coolant through a single vessel containing both the reactor core and a plurality of heat exchangers disposed in parallel, said reactor being primarily characterized in that provision is made for a separate circuit for supplying coolant to each heat exchanger and comprising a top point and in that means are provided for injecting gas at said top point at a sufficiently high pressure to drive said coolant downwards from said top point and to prevent it from flowing towards the corresponding heat exchanger. According to a preferred embodiment of the invention, each heat exchanger comprises a general shell provided with inlets for the admission of coolant at the top and outlets for the discharge of coolant at the bottom, a partition which is fixed above the inlets and which extends downwardly below said inlets, and means for injecting gas at the top of the space formed by said partition at a pressure which is sufficient to force the coolant downwards within said space and within the heat exchanger to a level which is lower than that of said inlets.

The invention also consists of other arrangements which can advantageously be employed in conjunction with the preceding but which can be employed independently. All of these arrangements will become more readily apparent from the following description of a reactor in accordance with the invention which is given by way of example. Reference is made in the description to the accompanying drawings, in which:

FIG. 1 is a very diagrammatic sectional view along a vertical plane showing the bottom portion of a reactor in accordance with the invention;

Figure 4:
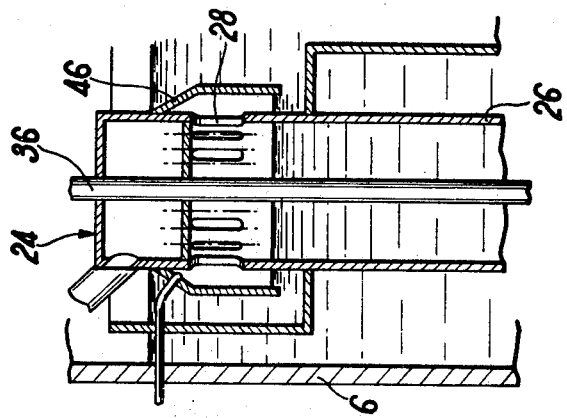
Figure 3:
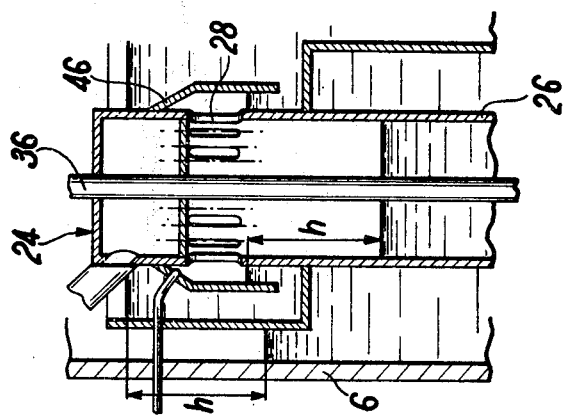
Figure 2:
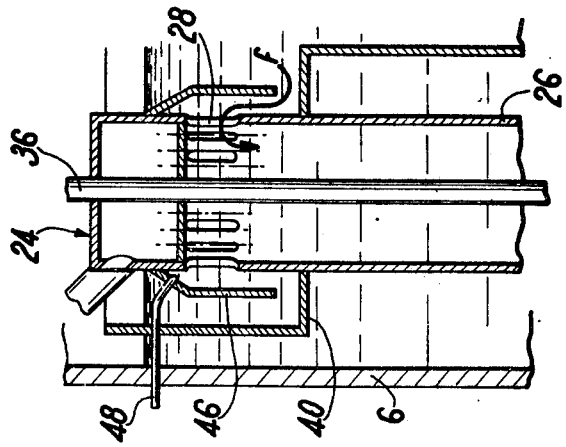
FIG. 2 is a very diagrammatic sectional view along a vertical plane in which the top portion of the heat exchanger of FIG. 1 is shown when the pumps are stopped.

FIG. 3, which is similar to FIG. 2, corresponds to the isolation of the heat exchanger with the pumps in operation;

FIG. 4, which is similar to FIG. 3, corresponds to the isolation of the heat exchanger with the pumps stopped.

The reactor whose lower portion is shown very diagrammatically in FIG. 1 is of the fast neutron type which is cooled by a circulation of molten metal. Said reactor comprises a core 8 and a plurality of heat exchangers which are placed in a single vessel in a general arrangement of known type which will be recalled only briefly hereunder. The reactor core 8 is made up of a plurality of juxtaposed assemblies such as the assembly 10 and disposed within the leak-tight outer vessel 6 which is closed at the top by a seal plug and placed inside a biological shield structure (not shown in the drawings) which may be formed of concrete, for example. The end of each assembly 10 is inserted in a diagrid 12 which, in conjunction with the base 14 of a core tank which is open at the top and also has a side wall 16, forms a distribution header 18. The reactor core and core tank 16 are immersed in a mass 20 of molten sodium which fills the bottom of the outer vessel 6 and above which is provided an atmosphere 22 of inert gas (such as argon, for example).

A number of heat exchangers 24, only one of which is shown in FIG. 1, are spaced around the reactor core. Each heat exchanger 24 comprises a vertical-axis shell 26 provided at the top with inlet windows 28 for the admission of coolant and at the bottom with outlet windows 30. The ends of each shell 26 are constituted by compartments 32 and 34 for the collection of secondary fluid (water and vapor, for example) which is fed into the bottom compartment 34 through a central duct 36 and evaporated in a tube bank 38 which interconnects the two compartments. The heat exchangers are disposed within the outer vessel at a level such that, even when the circulating pumps are stopped, the entire heat exchanger shell is filled with liquid sodium. A transverse partition 40 which is traversed by the heat exchanger shells 26 divides the outer vessel into two compartments forming headers which are associated respectively with the inlet windows 28 and outlet windows 30.

There are also placed within the outer vessel one or preferably a number of circulating pumps 42, only one of which is shown in the drawings. The function of said pumps is to draw the coolant into the compartment which is associated with the outlet windows 30 of the heat exchangers and feed back said coolant into the distribution header 18 via a duct 44.

During normal operation of the reactor, the coolant flows along the path shown by the arrows $f$ in FIG. 1: starting from the distribution header 18, the molten sodium flows into the reactor core 8, passes into one of the compartments which is separated within the outer vessel by the partition 40, flows through the heat exchangers 24, then into the other compartment and returns to the pumps 42 which feed it back into the distribution header 18. These pumps maintain between the upstream and downstream ends of the heat exchangers 24 a driving pressure $h$ (FIG. 1), the value of which establishes the flow rate.

In accordance with the invention, each heat exchanger 24 is provided with a bell-shaped partition or casing 16 which is secured in leak-tight manner to the heat exchanger shell 26 at a level above the inlet windows 28 and which extends in the liquid sodium to a point below the lower ends of the windows 28. The top portion of the space which is formed around the heat exchanger by the bell-casing 46 is connected by means of a pipe 48 fitted with a regulating and shut-off valve 50 to a source of gas under pressure which is inert with respect to the coolant and practically insoluble in this latter: said gas is preferably of the same nature as that which constitutes the atmosphere 22. By virtue of the presence of the bell-casing 46, the coolant which is intended to pass through the windows 28 into the heat exchanger shell 26 is caused to follow an S-shaped path as indicated by the arrows $f$ in FIG. 1. During normal operation, the space formed within the bell-casing 46 is not pressurized and is completely filled with the sodium which circulates within all of the heat exchangers. When the pumps are stopped, and by virtue of the fact that there is no gas under pressure within said space, the level within the two compartments is substantially balanced and a circulation of sodium at a low flow rate can remain within all of the heat exchangers as a result of natural convection caused by heating within the reactor core 8 (FIG. 2).

When it is desired to isolate a heat exchanger 24, inert gas is fed into the bell-casing 46 via the pipe 48 at a pressure which is sufficient to displace the free surface of the coolant downwards within the bell-casing to a level which is lower than that of the inlet windows 28 (as shown in FIG. 3). The difference in level $h$ which is maintained by the pumps between the upstream and downstream ends of the heat exchangers in service is again present between the interior of the bell-casing 46 and the interior of the heat exchanger shells 26. The circulation of coolant is interrupted and the top portion of the heat exchanger is even freed of coolant.

If the pumps are stopped when one of the heat exchangers 24 is isolated in the manner which has just been explained, isolation is maintained as shown in FIG. 4: the difference in level $h$ is reduced to zero and the levels are equalized solely within the bell-casing 46 and within the shell 26. The low coolant flow resulting from convection which remains as long as heat is released from the reactor core is only present in those heat exchangers which are not isolated.

It is apparent that the invention makes it possible to achieve the desired results. Furthermore, it provides a certain number of related advantages: the bell-casings which are disposed around the inlet windows of the heat exchangers is conducive to equipartition of the total flow between the heat exchangers and between the windows of one heat exchanger; the bell-casings can be so designed as to prevent the generation of a vortex at the inlet of the heat exchangers.

The mode of execution of the invention which has just been described can evidently extend to a large number of alternative forms. For example, the level inside the partition 40 being fixed, the positions of the exchanger inlet windows 28 can then be raised above said level so as to establish a flow which forms a siphon, this being made possible by virtue of the presence of the bell-casing. In some cases, this arrangement makes it easier to solve problems of positioning of the heat exchanger or of cooling by natural convection. On the other hand, control of isolation and recommissioning by means of the gas under pressure which is supplied through the pipe 48 is somewhat complex. The single bell-casing which is placed around the inlet windows of a heat exchanger can be replaced by individual troughs which are coupled in parallel. Finally, the invention is applicable to reactors having a general arrangement which is different from that which is shown in FIG. 1: For example, the invention can be employed in a reactor in which the core is cooled by two separate primary circuits at different admission pressures which feed separate zones of the reactor core.

It must be understood that modifications such as those referred-to or, in a more general sense, any alternative forms of all or part of the arrangements described which remain within the definition of equivalent mechanical means are covered by this patent.

What we claim is:

1. A nuclear reactor which is cooled by circulating a liquid coolant through a single vessel containing the reactor core and a plurality of heat exchangers disposed in parallel, provided with a separate circuit for supplying coolant to each heat exchanger and which has a top point and means for injecting a gas inert with respect to the coolant at said top point at a pressure which is sufficient to drive the coolant downwards from said top point and to prevent additional coolant from entering the corresponding heat exchanger.

2. A nuclear reactor in accordance with claim 1, in which said top point is located at a level below that which is reached by the coolant within the vessel when there is no coolant flow within said vessel.

3. A reactor in accordance with claim 1, in which each heat exchanger comprises a general shell provided with inlets for the admission of coolant at the top and outlets for the discharge of coolant at the bottom, a partition fixed above the inlets, and means for injecting at the top of the space formed by the partition a gas which is at a sufficient pressure to force the free surface of the coolant downwards within said space and within said heat exchanger to a level which is lower than that of said inlets.

4. A reactor in accordance with claim 1, in which said gas which is injected into the bell-casing is of the same nature as a gas which constitutes an atmosphere above the free surface of the coolant within the reactor vessel.

5. A reactor in accordance with claim 4, in which said coolant consists of liquid sodium and said gas consists of argon.

References Cited

UNITED STATES PATENTS

| | | | |
|---|---|---|---|
| 3,400,046 | 3/1966 | Hutchinson et al. | 176—65 |
| 3,242,981 | 9/1968 | Barker | 176—65 |

FOREIGN PATENTS 950,517  2/1964  Great Britain.

CARL D. QUARFORTH, Primary Examiner

H. E. BEHREND, Assistant Examiner

U.S. Cl. X.R.

165—96, 107; 176—65